(12) United States Patent
Tsai

(10) Patent No.: US 8,347,919 B2
(45) Date of Patent: Jan. 8, 2013

(54) INFLATING VALVE FOR AN INFLATABLE OBJECT

(75) Inventor: Chun-Chung Tsai, Dongguan (CN)

(73) Assignee: Dongguan Tiger Point, Metal & Plastic Products Co., Ltd., Dongguan, Guang Dong Province (CN)

( * ) Notice: Subject to any disclaimer, the term of this patent is extended or adjusted under 35 U.S.C. 154(b) by 238 days.

(21) Appl. No.: 12/860,598

(22) Filed: Aug. 20, 2010

(65) Prior Publication Data

US 2012/0042962 A1    Feb. 23, 2012

(51) Int. Cl.
*F16K 15/14*    (2006.01)

(52) U.S. Cl. ........ 137/854; 137/223; 137/232; 137/852; 137/855

(58) Field of Classification Search .................. 137/223, 137/226, 232, 233, 843, 855, 859, 852, 854; 446/224

See application file for complete search history.

(56) References Cited

U.S. PATENT DOCUMENTS

| | | | | |
|---|---|---|---|---|
| 3,808,981 A * | 5/1974 | Shaw | ............................. | 137/224 |
| 4,579,141 A * | 4/1986 | Arff | ............................... | 137/223 |
| 5,203,831 A * | 4/1993 | Lind et al. | ..................... | 137/223 |
| 5,285,816 A * | 2/1994 | Herlihy | ....................... | 137/527.8 |
| 6,135,143 A * | 10/2000 | Po | ................................. | 137/522 |
| 6,138,711 A * | 10/2000 | Lung-Po | ..................... | 137/527.8 |
| 6,237,621 B1 * | 5/2001 | Chaffee | ........................ | 137/223 |
| 6,648,004 B2 * | 11/2003 | Lau | ................................ | 137/223 |
| 6,823,905 B1 * | 11/2004 | Smith et al. | ................ | 137/527.8 |
| 7,152,619 B2 * | 12/2006 | Hwang | ......................... | 137/223 |
| 7,401,619 B2 * | 7/2008 | Song et al. | .................... | 137/223 |
| 8,181,664 B2 * | 5/2012 | Tsai | ............................... | 137/223 |

\* cited by examiner

*Primary Examiner* — Craig Schneider
*Assistant Examiner* — Craig J Price
(74) *Attorney, Agent, or Firm* — Pai Patent & Trademark Law Firm; Chao-Chang David Pai

(57) ABSTRACT

An inflating valve has a body and a valve disk. The body is hollow and has a passage defined through the body and a holding tab. The passage has an inner surface and a bottom opening defined in the bottom of the body. The holding tab is radially connected to the inner surface of the passage and has a holding hole defined through the holding tab. The valve disk is attached securely to the bottom of the body to close the bottom opening of the passage and has a holding rod formed on and protruding from the valve disk and engaging the holding hole in the holding tab. Accordingly, the valve disk can be automatically opened by the pressured air and automatically closed by the recoil force provided by the holding tab.

10 Claims, 4 Drawing Sheets

INFLATING VALVE FOR AN INFLATABLE OBJECT

BACKGROUND OF THE INVENTION

1. Field of the Invention

The present invention relates to an inflating valve, and more particularly to an inflating valve that can close a passage automatically.

2. Description of Related Art

An inflatable object, such as a swim ring, a pneumatic boat, an inflating toy or furniture can be inflated for use and be flatted for conveniently carrying and storing. A conventional inflatable object has an inflating valve mounted on the object and connected to a pressured air source for inflating the object. The conventional inflating valve has a valve disk closing a passage in the inflating valve to keep air in the object from leaking.

However, during the inflating or flatting process, the valve disk has to be pushed away from the passage manually to allow the pressured air being led into or discharged from the object, but this will cause trouble and inconvenience of operation of the conventional inflating valve.

To overcome the shortcomings, the present invention tends to provide an inflating valve to mitigate or obviate the aforementioned problems.

SUMMARY OF THE INVENTION

The main objective of the invention is to provide an inflating valve that can close a passage automatically. The inflating valve has a body and a valve disk. The body is hollow and has a passage defined through the body and a holding tab. The passage has an inner surface and a bottom opening defined in the bottom of the body. The holding tab is radially connected to the inner surface of the passage and has a holding hole defined through the holding tab. The valve disk is attached securely to the bottom of the body to close the bottom opening of the passage and has a holding rod formed on and protruding from the valve disk and engaging the holding hole in the holding tab.

Other objects, advantages and novel features of the invention will become more apparent from the following detailed description when taken in conjunction with the accompanying drawings.

DETAILED DESCRIPTION OF PREFERRED EMBODIMENT

Figure 1:
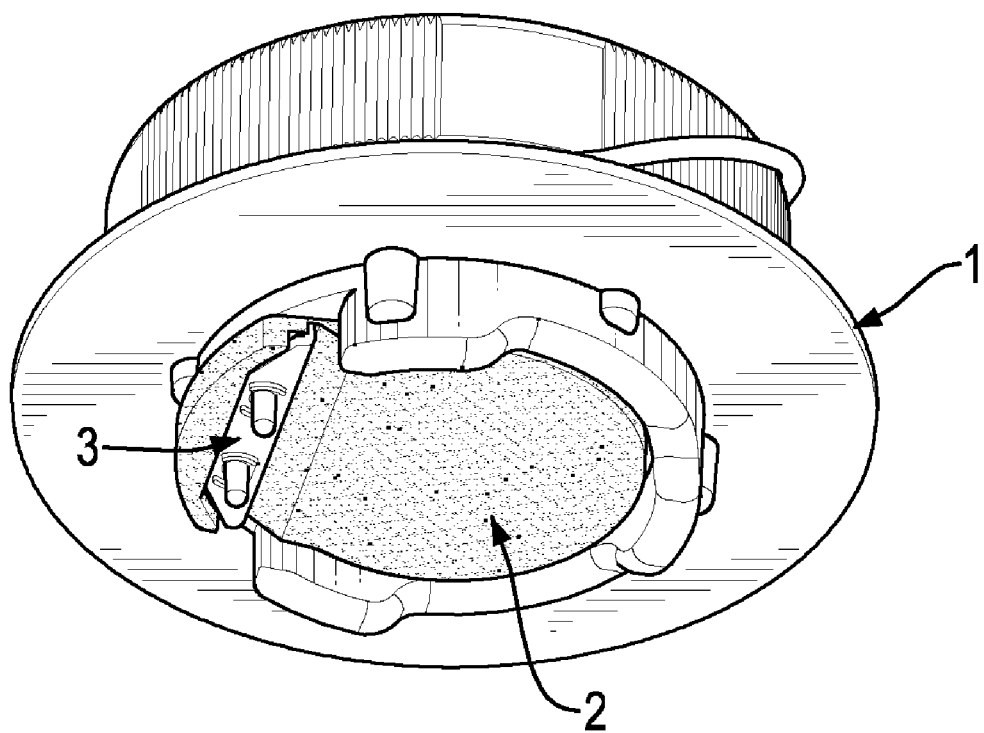
FIG. 1 is a perspective view of an inflating valve in accordance with the present invention.
Figure 2:
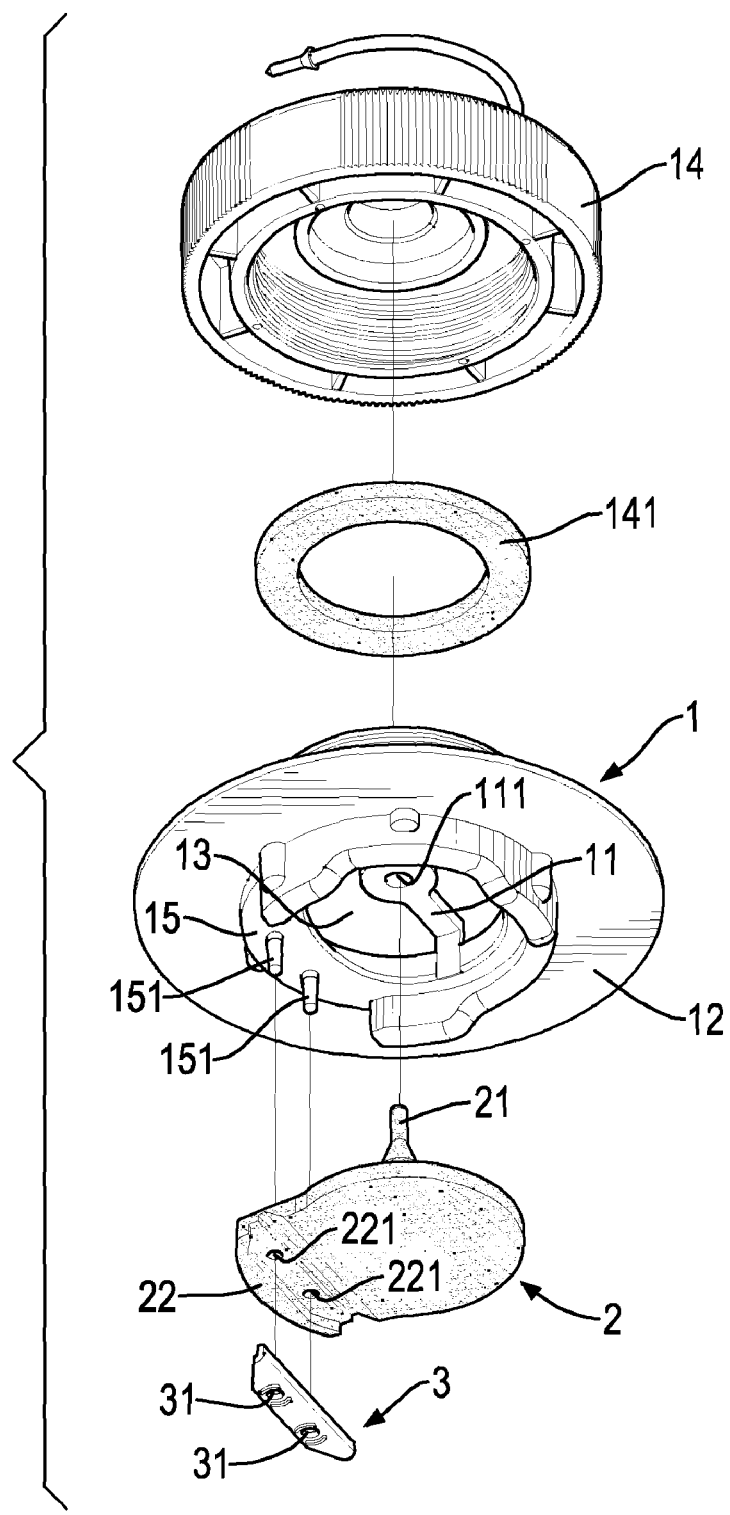
FIG. 2 is an exploded perspective view of the inflating valve in FIG. 1.
Figure 3:
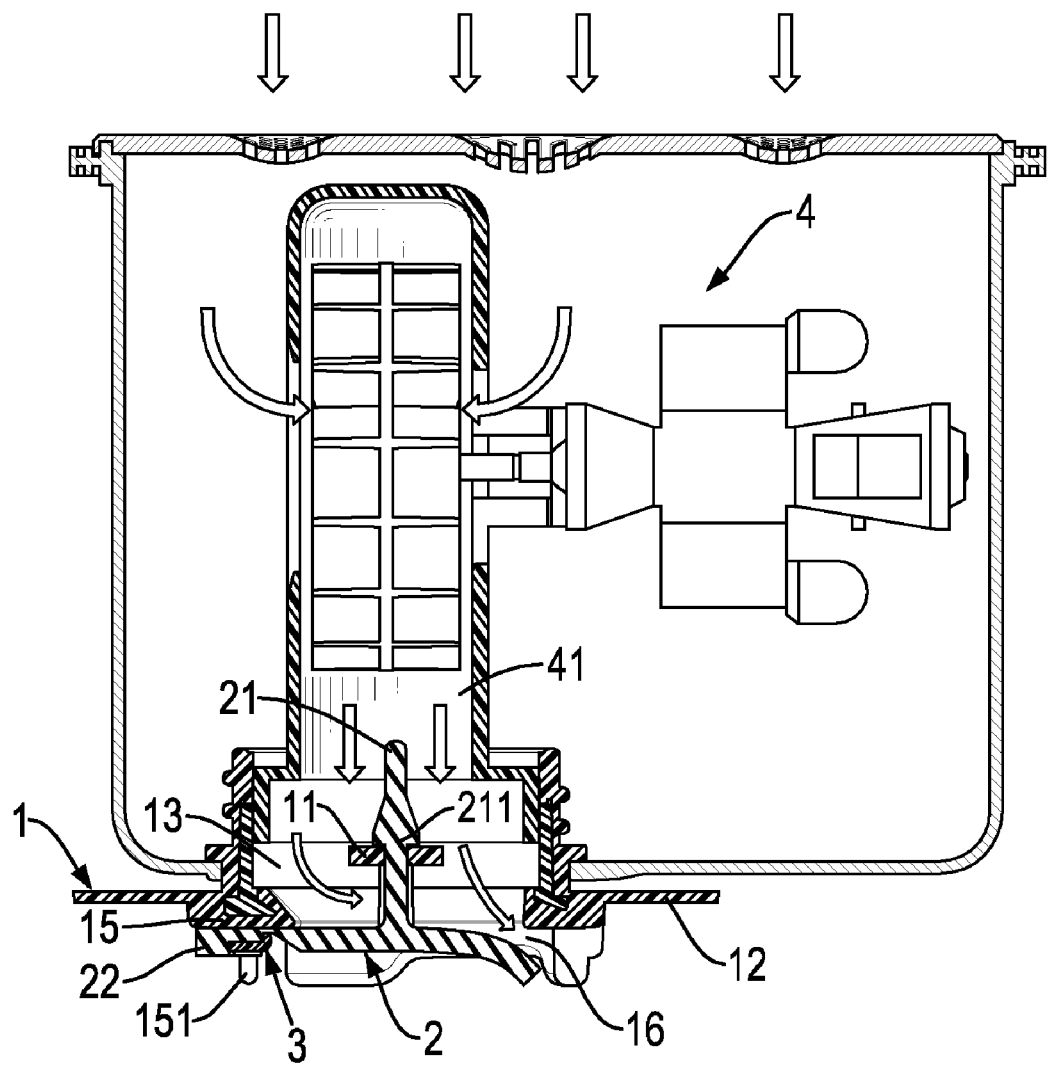
FIG. 3 is an operational side view in partial section of the inflating valve in FIG. 1 in an inflating condition connected to a pressured air source.

With reference to FIGS. 1 to 3, an inflating valve for an inflatable object in accordance with the present invention comprises a body 1, a cover 14, a valve disk 2 and a fixing element 3.

The body 1 is hollow, may be tubular and has an outer surface, a passage 13, a disk mount 15, an annular flange 12 and a holding tab 11. The passage 13 is defined through the body 1 and has a bottom opening defined in the bottom of the body 1 and a top opening defined in the top of the body 1. The disk mount 15 is formed on the bottom of the body 1, extends partially into the bottom opening and has at least one mounting post 151 formed on and protruding from the disk mount 15. Preferably, two mounting posts 15 are implemented. The annular flange 12 is formed around and protrudes from the outer surface of the body 1 to divide the body 1 into a top segment and a bottom segment and is connected to the inflatable object. The holding tab 11 is radially connected to the inner surface of the passage 13 and has a holding hole 111 defined through the holding tab 11. Preferably, the holding hole 111 is defined in the holding tab 11 at a position corresponding to a center of the passage 13.

The cover 14 is mounted on the top of the body 1 in a thread manner to close the top opening of the passage 13. Preferably, the body 1 has an outer thread formed on the outer surface around the top opening, and the cover 14 has an inner thread engaging the outer thread on the body 1. The cover 14 further has an O-ring 141 mounted between the cover 1 and the top of the body 1 to provide a sealing effect to the top opening of the body 1.

The valve disk 2 may be made of rubber material with excellent resilience, is attached securely to the bottom of the body 1 with the fixing element 3 to close the bottom opening of the passage 13 and has a mounting end 22, a free end and a holding rod 21. The mounting end 22 is mounted securely on the bottom of the body 1 and preferably attached to the disk mount 15 of the body 1 and has at least one mounting hole 221. Preferably, two mounting holes 221 are implemented. The mounting holes 221 are defined through the mounting end 22 of the valve disk 2 and are mounted respectively around the mounting posts 151 to attach the mounting end 22 of the valve disk 2 onto the disk mount 15 on the body 1. The free end is opposite to the mounting end 22. The holding rod 21 is formed on and protrudes from the valve disk 2 and engages the holding hole 111 in the holding tab 11. The holding rod 21 has a conical protrusion 211 formed on/near the top of the holding rod 21 and engaging the holding hole 111 in the holding tab 11. Preferably, the holding hole 111 is defined in the holding tab 11 at a position corresponding to a center of the valve disk 2.

The fixing element 3 is attached to the bottom of the body 1 to securely mount the valve disk 2 onto the disk mount 15 to keep the holding rod 21 from being detached from the holding hole 111 in the holding tab 11 if the air pressure is over an ordinary level. The fixing element 3 has at least one mounting hole 31 mounted respectively around the at least one mounting post 151 on the disk mount 15 of the body 1. Preferably, two mounting holes 31 are implemented. Each mounting post 151 is mounted through the corresponding mounting holes 221,31 in the valve disk 2 and the fixing element 3 in sequence to squeeze the mounting end 22 of the valve disk 2 between the disk mount 15 and the fixing member 3.

To inflate an inflatable object, with reference to FIG. 3, the cover 14 is detached from the body 1 to open the top opening, and the body 1 is connected to a pressured air source 4 having a connector 41. The connector 41 is inserted into the passage 13 of the body 1 via the top opening, such that pressured air can be led into the passage 13 via the connector 41 to push the free end of the valve disk 2 away from the bottom opening and to form a gap 16. Accordingly, the pressured air can enter into the object via the gap 16 between the free end of the valve disk 2 and the bottom opening to inflate the object. At this time, the holding rod 21 is kept engaging the holding tab 11 on the body, and the holding tab 11 is bent and stretched.

Figure 4:
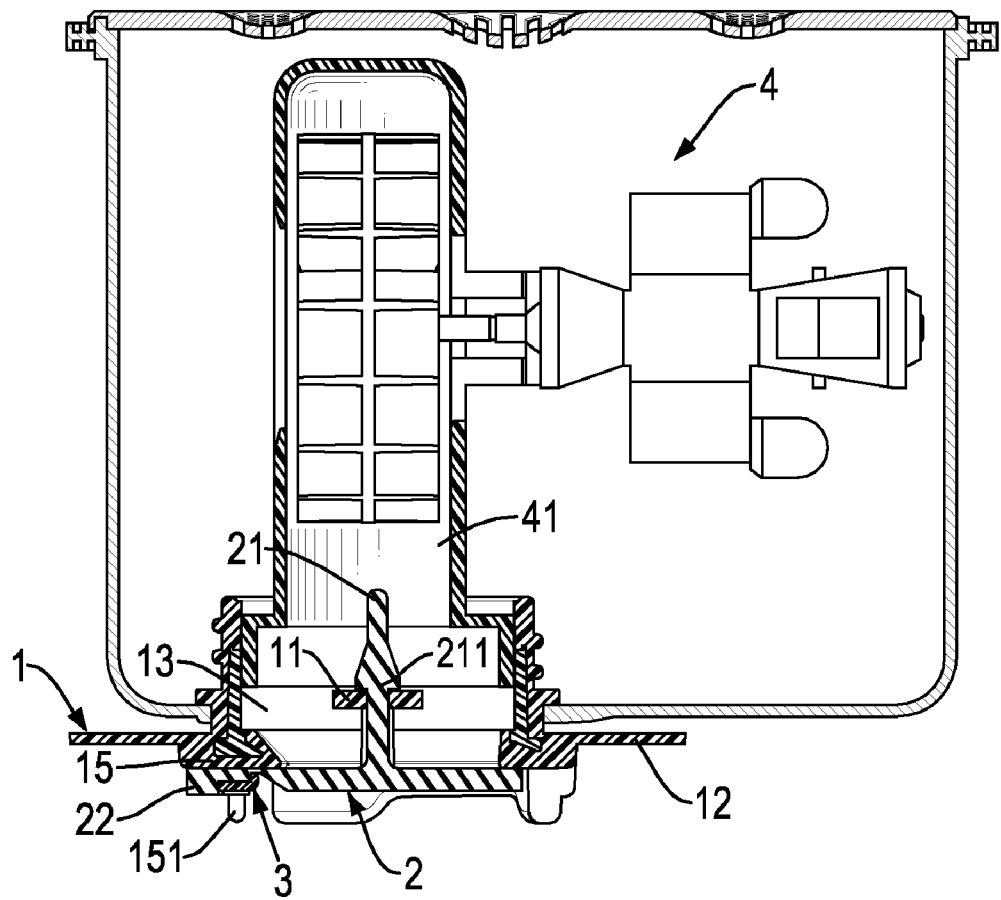
FIG. 4 is a side view in partial section of the inflating valve in FIG. 1 in a closing condition.

After the object is completely inflated, the pressured air source 4 is closed and the valve disk 2 can be automatically moved/pivoted to the closing condition to close the gap 16 as shown in FIG. 4 by the recoil force provided by the bent holding tab 11. Therefore, to open or close the valve disk 2 from the bottom opening is automatic but not manual, the operation of the inflating valve is easy and convenient.

Alternatively, the valve disk 2 may not have a mounting end 22 as shown and is connected to the body 1 by the connection between the holding rod 21 and the holding tab 11. Accordingly, the whole periphery of the valve disk 2 can be pushed away from the bottom opening of the passage 13 to form an annular gap for pressured air passing therethrough. After the inflating process is completed, the periphery of the valve disk 2 can close the bottom opening of the passage 13 automatically by the recoil force provided by the holding tab 11.

With aforementioned description, the inflating valve in accordance with the present invention has the following advantages.

1. The valve disk 2 can be pushed automatically by the pressured air to form a gap 16 and to allow the pressured air being led into the inflatable object via the gap 16. The valve disk 2 can automatically close the gap 16 and the bottom opening of the passage 13 with the recoil force provided by the holding tap 11 that engages the holding rod 21 on the valve disk 2. Therefore, the valve disk 2 can be opened or closed automatically but not manually, and the use and operation of the inflating valve is convenient.

2. To combine the holding rod 21 with the holding tab 11 is easily by extending the conical protrusion 211 on the holding rod 21 through the holding hole 111. To assemble the valve disk 2 with the holding tab 11 on the body 1 is easy and convenient.

3. The O-ring 141 mounted between the top opening of the passage 13 and the cover 14 can provide an excellent sealing effect to the top opening of the passage 13 to prevent the pressured air in the object from leaking.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An inflating valve for an inflating object comprising:
   a hollow body having
      a bottom;
      a passage defined through the body and having an inner surface and a bottom opening defined in the bottom of the body; and
      a holding tab radially connected to the inner surface of the passage and having a holding hole defined through the holding tab;
   a valve disk attached securely to the bottom of the body to close the bottom opening of the passage and having a holding rod formed on and protruding from the valve disk and engaging the holding hole in the holding tab, wherein
      the valve disk has a mounting end mounted securely onto the bottom of the body; and
   a fixing element is attached to the bottom of the body to securely mount the mounting end of the valve disk on the bottom of the body.

2. The inflating valve as claimed in claim 1, wherein the holding hole is defined in the holding tab at a position corresponding to a center of the valve disk.

3. The inflating valve as claimed in claim 2, wherein
   the body further has
      an annular flange formed around and protruding from an outer surface of the body; and
      a disk mount formed on the bottom of the body on which the mounting end of the valve disk is attached by the fixing member;
   the passage further has a top opening defined in a top of the body; and
   a cover is mounted on the top of the body in a thread manner to close the top opening of the passage.

4. The inflating valve as claimed in claim 3, wherein the cover further has an O-ring mounted between the cover and the top of the body.

5. The inflating valve as claimed in claim 4, wherein
   the body further has at least one mounting post formed on and protruding from the disk mount;
   the valve disk further has at least one mounting hole defined through the valve disk and mounted respectively around the at least one mounting post on the body; and
   the fixing element further has at least one mounting hole mounted respectively around the at least one mounting post on the body.

6. The inflating valve as claimed in claim 5, wherein the valve disk is made of rubber material.

7. The inflating valve as claimed in claim 1, wherein
   the body further has
      an annular flange formed around and protruding from an outer surface of the body; and
      a disk mount formed on the bottom of the body on which the mounting end of the valve disk is attached by the fixing member;
   the passage further has a top opening defined in a top of the body; and
   a cover is mounted on the top of the body in a thread manner to close the top opening of the passage.

8. The inflating valve as claimed in claim 7, wherein the cover further has an O-ring mounted between the cover and the top of the body.

9. The inflating valve as claimed in claim 7, wherein
   the body further has at least one mounting post formed on and protruding from the disk mount;
   the valve disk further has at least one mounting hole defined through the valve disk and mounted respectively around the at least one mounting post on the body; and
   the fixing element further has at least one mounting hole mounted respectively around the at least one mounting post on the body.

10. The inflating valve as claimed in claim 1, wherein the valve disk is made of rubber material.

* * * * *